United States Patent Office 3,300,394
Patented Jan. 24, 1967

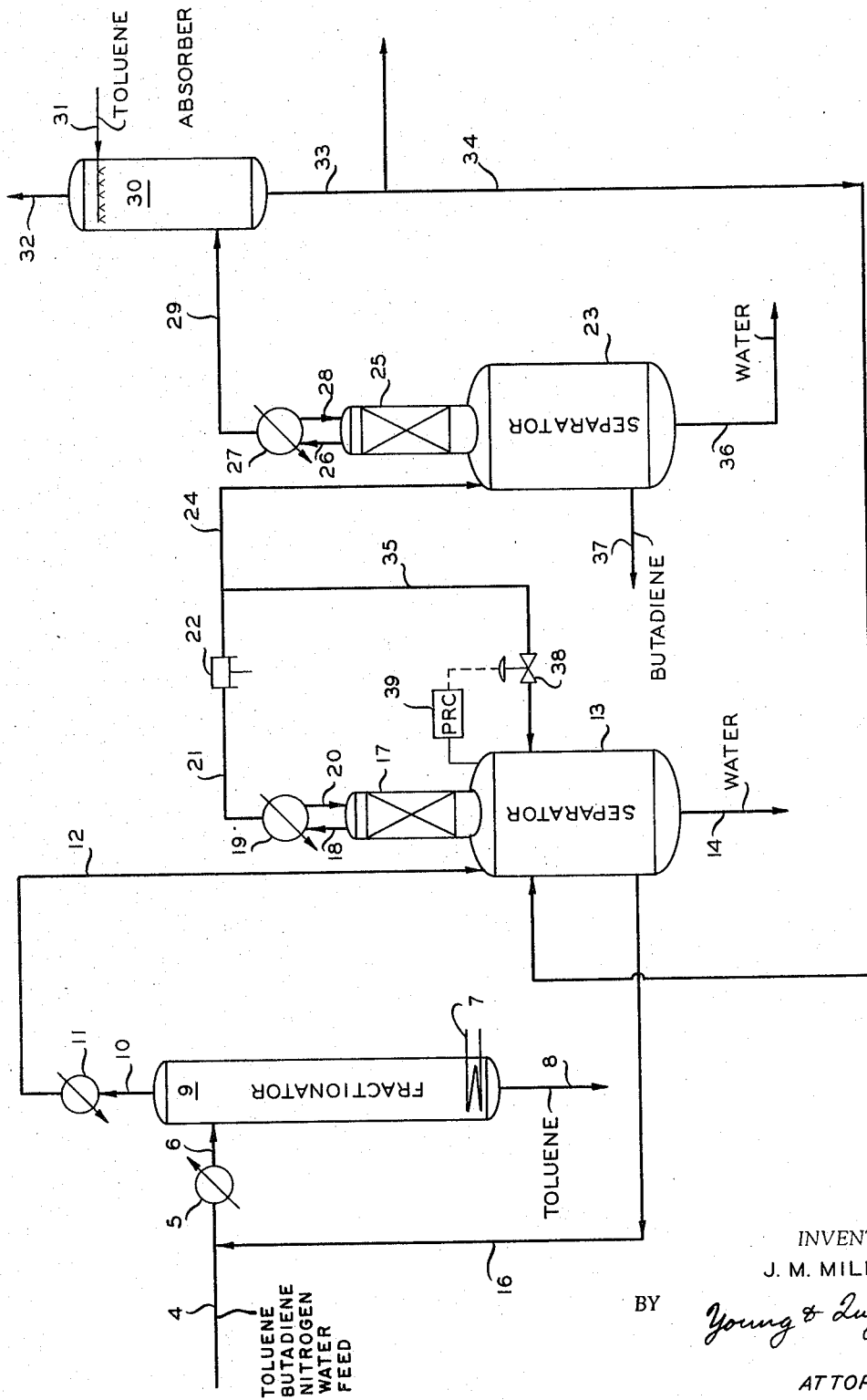

3,300,394
PROCESS AND APPARATUS FOR PLURAL DISTILLATION OF HYDROCARBON WATER FEED
John M. Miles, Bartlesville, Okla., assignor to Phillips Petroleum Company, a corporation of Delaware
Filed Aug. 26, 1963, Ser. No. 304,582
9 Claims. (Cl. 203—42)

This invention relates to the separation and recovery of constituents from liquid multi-component mixtures. In another aspect, this invention relates to the separation and recovery of hydrocarbon constituents from hydrocarbon mixtures containing water.

Water-free pure liquids find use in many chemical processes as solvents, diluents, absorbents, etc. For example, in the polymerization of olefins to solid polymers it has been found desirable to carry out the polymerization reaction in the presence of a liquid material which is a solvent for the polymer product and which serves as a diluent in the reaction mixture. Usually the solvent or diluent material is employed in very large quantities in comparison with the catalyst and reactants used in the polymerization process. For purposes of economy it has been found desirable to recover the solvent from the reaction effluent and, after suitable purification treatment, return the solvent to the polymerization reaction. The purification treatment involves the removal of various extraneous materials which become associated with the solvent during the polymerization reaction and subsequent polymer recovery operations. These extraneous materials include water, reject olefin and undesirable inert materials such as nitrogen. Many of these extraneous materials have an undesirable detrimental effect on the polymerization catalyst and reaction.

Accordingly, an object of my invention is to provide an improved liquid separation process and apparatus therefor.

Another object of my invention is to provide an improved process and apparatus for separating liquid hydrocarbon mixtures containing water.

Another object of my invention is to provide a process and apparatus for the separation and recovery of high purity constituents from hydrocarbon mixtures containing water.

Other objects, advantages and features of my invention will be readily apparent to those skilled in the art from the following description, the drawing and the appended claims.

Broadly, my invention is directed to the separation of constituents from liquid hydrocarbon mixtures containing water which comprises passing said liquid mixture to a fractionation zone, withdrawing a first liquid hydrocarbon fraction from said fractionation zone, withdrawing a vaporous fraction from said fractionation zone, partially condensing said vaporous fraction and passing said partially condensed vaporous fraction to a separation zone, withdrawing a second vaporous hydrocarbon constituent from said separation zone, withdrawing water from said separation zone, and passing a liquid fraction from said separation zone to said fractionation zone.

The process of this invention is applicable in general to the treatment of liquids with which water is partially miscible and from which water can be removed by fractionation. The process is particularly applicable to the treatment of hydrocarbons, including paraffins, such as propane, butane, pentane, hexane, etc.; olefins, such as propylene, butylene, amylene, heptylene, butadiene, etc.; cycloparaffins, such as cyclohexane, cyclopentane, dimethylcyclopentane, etc.; aromatics and other hydrocarbons in which water is only partially soluble. These hydrocarbons are frequently employed as diluents or solvents in the polymerization of olefins to solid polymers, utilizing catalysts which are sensitive to water such as organo-metal catalyst, chromium oxide containing hexavalent chromium and other catalysts.

The following discussion is directed to the separation and recovery of hydrocarbon solvents, reject monomer, inert materials and water although it is not intended that the invention should be limited thereto.

In carrying out the invention in one embodiment thereof, a liquid mixture comprising a hydrocarbon solvent, reject monomer, water and containing inert materials is heated to a temperature at which the entrained water contained therein passes into solution and is then introduced to a fractionating column. Within this column, which can be of any conventional design, such as a bubble tray column, a perforated tray column, a packed column, etc., additional heat is introduced to the liquid whereby vaporization of the lower boiling hydrocarbon monomer and water takes place. The vaporized material, which includes a portion of the hydrocarbon solvent, is withdrawn overhead from the fractionating column and cooled to a sufficient temperature to condense the water and solvent.

The mixture of condensed liquid and vapors is introduced into a separation zone. The separation zone contains a rectification zone. Vapors passing from the separation zone are passed through the rectification zone and into a condensing zone wherein hydrocarbon solvent contained in the vapors is condensed. The condensed hydrocarbon solvent is passed from the condensing zone through the rectification zone in countercurrent contact with the vaporous phase passed from the separation zone. From the rectification zone the condensed hydrocarbon solvent is passed to the lower region of the separation zone. Water is withdrawn from the bottom of the separation zone. A liquid hydrocarbon phase is withdrawn from the separation zone and recycled to the fractionator as reflux.

Alternately, the reflux can be heated separately before it is returned to the fractionator or it can be combined with the liquid feed and the combined stream heated and introduced to the fractionator. The bottoms from the fractionator comprise the purified hydrocarbon solvent which is substantially freed from the reject monomer, water and inert constituents.

In a second embodiment, the vaporous fraction withdrawn from the condenser is compressed and the compressed vaporous phase passed to a second separator. As in the case of the first separator, the second separator contains a rectification zone in the upper region of the separator. Vapors are passed through the rectification zone and from the rectification zone to a second condenser wherein the reject monomer is condensed. Condensed monomer is passed from the second condenser through the rectification zone of the second separator and is withdrawn from the lower region of the second separator. Water contained in the vaporous feed to the second separator is withdrawn from the bottom of the second separator. A vaporous phase comprising hydrocarbons boiling lower than the reject monomer and inert gaseous material such as nitrogen is withdrawn from the second condenser.

In a third embodiment, the vaporous phase withdrawn from the second condenser is passed to an absorber wherein the vaporous phase is intimately countercurrently contacted with liquid solvent. Any reject monomer thus remaining in the vaporous phase withdrawn from the second condenser is scrubbed from the vaporous phase by the liquid solvent and a liquid solvent stream is recycled from the absorber to the first separator.

The drawing illustrates a schematic representation of one embodiment of the invention.

Referring to the drawing, a specific illustration of my process will be illustrated wherein a liquid stream comprising toluene, butadiene, hydrocarbons boiling below butadiene and an inert material (nitrogen) is separated by my invention and product toluene, butadiene and water recovered therefrom. The liquid feed is passed via conduit means 4 to a heat exchange means 5 wherein the liquid feed is heated to a temperature of 259° F. The heated liquid feed is then passed via conduit means 6 to the upper region of fractionator 9.

Fractionator 9 is operated at a bottom temperature of 273° F., a top temperature of 230° F., a bottom pressure of 28 p.s.i.a. and a top pressure of 23 p.s.i.a. Fractionator 9 is heated by means of a heat exchange means 7 positioned in the lower region of fractionator 9. A liquid toluene product stream is withdrawn from the bottom of fractionator 9 via conduit means 8. A vaporous stream comprising toluene, butadiene, low-boiling hydrocarbons, water and nitrogen is withdrawn from the top to fractionator 9 via conduit means 10 and passed to a heat exchange means 11 wherein partial condensation of the vaporous feed is effected.

A liquid-vaporous mixture at a temperature of 100° F. is passed from heat exchange means 11 via conduit means 12 to a separator 13. Water is withdrawn from the bottom of separator 13 via conduit means 14. A liquid phase comprising toluene, butadiene, low-boiling hydrocarbons, water and nitrogen is withdrawn from separator 13 and recycled via conduit means 16, heat exchange means 5 and conduit means 6 to a fractionator 9 in combination with the feed to fractionator 9. A vaporous mixture comprising toluene, butadiene, low-boiling hydrocarbons, water and nitrogen is passed upwardly through a rectification zone 17 positioned in the upper region of separator 13. Rectification zone 17 can contain a means such as Raschig rings for intimately contacting a vapor moving through said rectification zone with a countercurrently flowing liquid.

A vapor phase is withdrawn from the top of separator 13 via conduit means 18 and passed to a means 19 for condensing the toluene contained within the vaporous feed to the condensing means. Condensed toluene is withdrawn from condensing means 19 and passed via conduit means 20 to separator 13 and the top of rectification zone 17. Although conduit means 18 and 20 are herein illustrated as separate means of conducting fluids, it is within the scope of this invention to employ a single conduit means between separator 13 and condensing means 19.

A vaporous phase at a temperature of 50° F. is withdrawn from condensing means 19 and passed via conduit means 21 to a means 22 for compressing the vaporous phase. Compressed vapors at a pressure of 60 p.s.i.a. and at a temperature of 90° F. are passed from means 22 for compressing to separator 23 via conduit means 24. It is within the scope of this invention to recycle a portion of the compressed vapors via conduit means 35 and valve means 38 to separator 13. A desired vapor pressure within the separation process system can thus be maintained by measuring the vapor pressure within separator 13 by means of pressure-recorder-controller 39 and opening and closing valve means 38 responsive to said pressure measurement and a set point representative of the desired pressure.

A vapor phase within separator 23 is passed to rectification zone 25. A vapor phase is withdrawn from rectification zone 25 and separator 23 and passed via conduit means 26 to a condensing means 27. As in the case of the rectification zone within separator 13, rectification zone 25 can contain Raschig rings or other means for intimately contacting countercurrently flowing liquid and vaporous streams.

Within condensing means 27, the feed is cooled to a temperature of 40° F., condensing the butadiene in the feed to condensing means 27. The liquid butadiene is passed from condensing means 27 via conduit means 28 to the top of separator 23 and rectification zone 25. Liquid butadiene is withdrawn from separator 23 via conduit means 37. Water contained in the feed to separator 23 is withdrawn from separator 23 via conduit means 36. As in the case of conduit means 18 and 20, conduit means 26 and 28 can comprise a single means for conducting a fluid between condensing means 27 and separator 23.

A vaporous stream at a temperature of 40° F. and at a pressure of 58 p.s.i.a. is passed from condensing means 27 via conduit means 29 to absorber 30. Within absorber 30, the vaporous feed is countercurrently contacted with toluene passed to absorber 30 via conduit and dispensing means 31. As in the case of rectification zones 17 and 24, absorber 30 can contain means such as Raschig rings for intimately contacting vaporous and liquid feeds. A liquid stream is withdrawn from absorber 30 via conduit means 33. A vaporous stream is withdrawn from absorber 30 via conduit means 32.

It is within the scope of this invention to recycle the liquid phase withdrawn from absorber 30 to separator 13 via conduit means 33 and 34. By recycling the liquid stream from absorber 30 to separator 13, substantially complete recovery of butadiene is effected.

The following table presents a material balance of the inventive separation process employing the above process conditions. All figures are representative of barrels per stream day.

Table

| Constituent | Conduit 4 | Conduit 6 | Conduit 8 | Conduit 12 | Conduit 14 | Conduit 24 |
|---|---|---|---|---|---|---|
| Butadiene | 8,039 | 100,413 | 44 | 100,369 | | 8,111 |
| Hydrocarbons boiling lower than butadiene | 2,093 | 26,146 | 12 | 26,134 | | 2,112 |
| Toluene | 935,698 | 1,348,484 | 943,409 | 405,075 | | 100 |
| Water | 1,556 | 1,824 | 1 | 1,823 | 1,280 | 275 |
| Nitrogen | 140 | 151 | | 151 | | 140 |

| Constituent | Conduit 29 | Conduit 31 | Conduit 32 | Conduits 33 and 34 | Conduit 36 | Conduit 37 |
|---|---|---|---|---|---|---|
| Butadiene | 118 | | 2 | 116 | | 7,993 |
| Hydrocarbons boiling lower than butadiene | 33 | | 2 | 31 | | 2,079 |
| Toluene | | 7,811 | | 7,811 | | 100 |
| Water | | | | | 268 | 7 |
| Nitrogen | 132 | | 134 | 2 | | 6 |

It is evident by noting the data presented in the table that by my invention a separation process has been provided whereby toluene substantially free of butadiene and butadiene substantially free of toluene has been recovered from a hydrocarbon mixture containing water. Although fractionation processes are conventionally employed to separate hydrocarbon constituents from hydrocarbon mixtures wherein the said hydrocarbon constituents have different vaporization temperatures, the presence of water in the hydrocarbon mixture prevents the efficient utilization of conventional fractionation processes to effect the desired hydrocarbon separation.

By my invention I have provided a separation process wherein separation of the hydrocarbon constituents is begun in a fractionation zone, continued in a separation zone and completed in the said fractionation zone.

Various modifications of this invention can be made, or followed, in view of the foregoing disclosure, without departing from the spirit or scope thereof.

I claim:

1. A process which comprises passing a hydrocarbon mixture containing water to a fractionation zone, withdrawing a vapor phase from said fractionation zone, partially condensing said withdrawn vapor phase, passing the resultant liquid-vapor mixture to a first separation zone, withdrawing a vapor phase from said separation zone and passing the said vapor phase through a first rectification zone, condensing a first hydrocarbon contained within the resultant vapor phase withdrawn from said rectification zone, passing said condensed first hydrocarbon through said first rectification zone to said first separation zone, compressing the remainder of said vapor phase withdrawn from said rectification zone, passing the resultant compressed vapors to a second separation zone, withdrawing a vapor phase from said second separation zone and passing the said vapor phase withdrawn from said second separation zone to a second rectification zone, condensing a second hydrocarbon contained within the resultant vapor phase withdrawn from said second rectification zone, passing the resultant condensed said second hydrocarbon through said second rectification zone to said second separation zone, withdrawing said second hydrocarbon from said second separation zone, passing a liquid phase from said first separation zone to said fractionation zone, withdrawing said first hydrocarbon from said fractionation zone, and withdrawing water from said first separation zone and said second separation zone.

2. The process of claim 1 to include passing the remainder of said vapor phase withdrawn from said second rectification zone to an absorption zone, passing said first hydrocarbon to said first absorption zone, withdrawing a vapor phase from said absorption zone, and passing a liquid phase from said absorption zone to said first separation zone.

3. The process of claim 1 to include measuring a process variable representative of the vapor pressure within said first separation zone, and manipulating recycle of said resultant compressed vapors to said first separation zone responsive thereto.

4. The process of claim 2 wherein said hydrocarbon mixture contains toluene, butadiene, nitrogen, and water, said first hydrocarbon is toluene, and said second hydrocarbon is butadiene.

5. Apparatus which comprises a fractionator, a first separation vessel, first conduit means in communication with the upper region of said fractionator, second conduit means in communication with the lower region of said fractionator, third conduit means communicating with the top of said fractionator and said first separation vessel, a first means for partially condensing a fluid flowing through said third conduit means, fourth conduit means communicating between a lower region of said separation vessel and the upper region of said fractionator, a first rectification zone in the upper region of said first separation vessel, a second means for partially condensing a fluid, fifth conduit means communicating between the upper region of said first rectification zone and said second condensing means, a second separation vessel, sixth conduit means communicating between said second means for partially condensing a fluid flowing through said fifth conduit means and said second separation vessel, means for compressing a fluid flowing through said sixth conduit means, said second separation vessel containing a second rectification zone in the upper region of said second separation vessel, seventh conduit means communicating with the top of said second rectification zone, third means for partially condensing a fluid flowing through said seventh conduit means, eighth conduit means communicating with the lower region of said second separation vessel, ninth conduit means communicating with the bottom of said second separation vessel, and tenth conduit means communicating with the bottom of said first separation vessel.

6. The apparatus of claim 5 to include an absorber, eleventh conduit means communicating between said third means for partially condensing a fluid and said absorber, twelfth conduit means communicating with the upper region of said absorber, thirteenth conduit means communicating with the top of said absorber, and fourteenth conduit means communicating with the bottom of said absorber.

7. The apparatus of claim 6 to include fifteenth conduit means communicating between said fourteenth conduit means and said first separation vessel.

8. A process which comprises passing a hydrocarbon mixture containing toluene, butadiene, nitrogen, and water to a fractionation zone, withdrawing a first vapor phase from said fractionation zone, partially condensing said first vapor phase, passing the resulting liquid vapor mixture to a first separation zone, withdrawing water from said first separation zone, withdrawing a second vapor phase from said first separation zone, passing the said second vapor phase through a first rectification zone, condensing toluene from said second vapor phase to form a third vapor phase, passing the said condensed toluene through said first rectification zone to said first separation zone, passing a liquid phase from said first separation zone to said fractionation zone, compressing said third vapor phase, passing said compressed third vapor phase to a second separation zone, withdrawing a fourth vapor phase from said second separation zone, withdrawing water from said second separation zone, passing said fourth vapor phase through a second rectification zone, condensing butadiene from said fourth vapor phase to form a fifth vapor phase, passing the said condensed butadiene through said second rectification zone to said second separation zone, withdrawing butadiene from said second separation zone, passing said fifth vapor phase to an absorption zone, passing toluene to said absorption zone, withdrawing a vapor phase from said absorption zone, and passing a liquid phase from said absorption zone to said first separation zone, withdrawing toluene from said fractionation zone.

9. The process of claim 8 to include measuring a process variable representative of the vapor pressure within the said first separation zone, and passing a first portion of said condensed third vapor phase to said first separation zone responsive thereto and passing a second portion of said compressed third vapor phase to said second separation zone.

References Cited by the Examiner
UNITED STATES PATENTS

| | | | |
|---|---|---|---|
| 1,282,324 | 10/1918 | Tschudy | 202—158 |
| 2,377,736 | 6/1945 | White | 203—87 X |
| 2,571,329 | 10/1951 | Berg | 62—23 X |
| 2,600,106 | 6/1952 | Garrett | 203—49 X |
| 2,705,698 | 4/1955 | Hammer | 203—41 |
| 2,804,488 | 8/1957 | Cobb | 62—23 |

NORMAN YUDKOFF, *Primary Examiner.*

F. E. DRUMMOND, *Assistant Examiner.*

UNITED STATES PATENT OFFICE
CERTIFICATE OF CORRECTION

Patent No. 3,300,394　　　　　　　　　　　January 24, 1967

John M. Miles

It is hereby certified that error appears in the above numbered patent requiring correction and that the said Letters Patent should read as corrected below.

Column 5, line 46, for "said first absorption zone" read -- said absorption zone --.

Signed and sealed this 22nd day of October 1968.

(SEAL)
Attest:

Edward M. Fletcher, Jr.
Attesting Officer

EDWARD J. BRENNER
Commissioner of Patents